March 19, 1957  F. W. SAMPSON  2,786,108
HORN BLOWING MECHANISM
Filed Dec. 15, 1954

INVENTOR.
FREDERICK W. SAMPSON
BY
HIS ATTORNEY

2,786,108
HORN BLOWING MECHANISM

Frederick W. Sampson, Dayton, Ohio, assignor to General Motors Corporation, Detroit, Mich., a corporation of Delaware Application December 15, 1954, Serial No. 475,351

4 Claims. (Cl. 200—61.55)

This invention relates to horn buttons and is particularly concerned with horn buttons which may be used in connection with tiltable steering wheels.

Recent trends in automotive design are directed to a wide variety of innovations and one of these is concerned with a steering wheel which is tiltable with respect to the steering column to facilitate entry and egress from the driver's seat. In this structure the wheel may be locked in steering position when desired. Furthermore, the horn may be operated regardless of the position of the wheel. Thus, the horn may be operated when the car is parked and the steering wheel is tilted away from the driver.

This invention is directed to a horn button assembly which may be used in combination with a tilting steering wheel and an adjustable length steering column. One form of such a structure is clearly described and claimed in my copending application S. N. 475,392, filed concurrently herewith and assigned to the assignee of this invention.

It is therefore the prime object of this invention to provide a horn button assembly for use with a tiltable type steering wheel which is operative to connect and disconnect the horn circuit regardless of the position of the steering wheel with respect to the steering column.

In carrying out this object it is a further object of the invention to provide a horn button assembly wherein an elongated movable contact is supplied which is engageable with a stationary contact positioned at the center of rotation of the wheel whereby the elongated contact is engageable with the stationary contact in any position of the wheel with respect to the steering column.

Further objects and advantages of the present invention will be apparent from the following description, reference being had to the accompanying drawings, wherein preferred forms of the invention are clearly shown.

Since the construction of the tiltable wheel is clearly shown and described in my copending application, the description to follow will be directed in the main to the horn button construction only.

Figure 1:
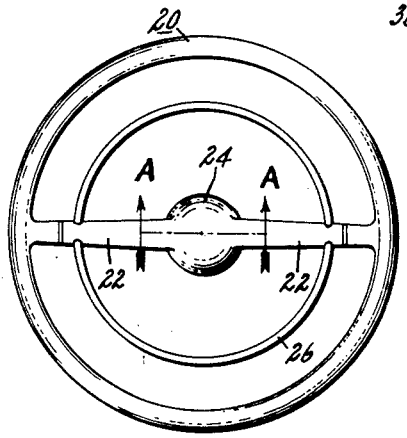
Figure 1 is a plan view of one type of steering wheel showing at A—A the position of the section taken in connection with Figures 2, 3 and 4.

Referring to Figure 1, a steering wheel is shown at 20 having two spokes 22 and a horn or spoke cover 24 therefore. The horn cover may be integrally attached to a horn blowing ring 26 so that the horn button switch can be actuated either from the spoke cover 24 or the ring 26.

Figure 2:
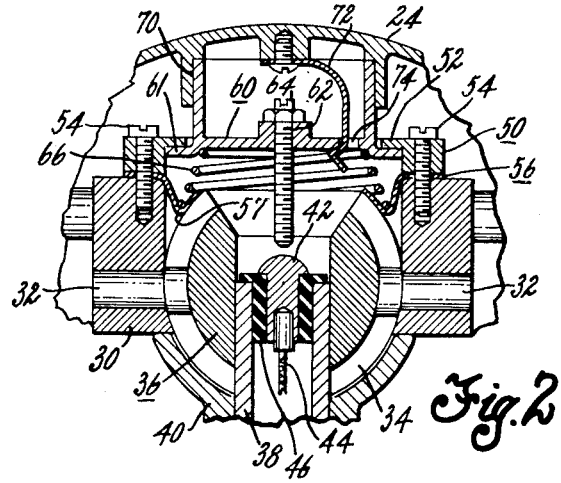
Figure 2 is a fragmentary view in section taken on line A—A of Figure 1 showing the hub portion and horn button of a tiltable wheel with the wheel in locked position and the horn circuit open.

In Figure 2 a section taken on line A—A of Figure 1 is shown wherein a hub 30 of the wheel includes two lugs or keys 32 journaled therein which may be freely rotatable in their journals. The lugs or keys 32 fit and slide within slots 34 carried by a ball 36 which is positioned at the end of a steering column 38. A socket 40 in the form of a cup is used to lock the wheel in position as described in my copending application. At the end of the steering column 38 is positioned a contact 42 which forms one side of the horn blowing circuit. The contact 42 is connected by wire 44 in the circuit and is insulated by means of bushing 46 from the steering column. On the hub portion 30 of the wheel is positioned an apertured flanged retaining member 50 wherein the flange portion 52 extends inwardly thereof around the aperture. The retainer 50 is held to the hub 30 by means of screws 54. Clamped between the retainer 50 and the hub 30 is a flanged apertured plate 56 which may be termed a brush since it preferably is sufficiently springy at 57 thereof to wipe the surface of the ball 36 and maintain engagement and electrical contact therewith at all times. Furthermore this retainer may have the dual function of acting as a restraining means for establishing some drag with respect to the wheel being rotated on the ball. In this connection the portion 57 may be slit to increase its springiness or it may comprise three or more tongues only instead of a substantially complete ring as shown.

Passing through the central aperture in the retainer plate 50 and loosely held therein by means of the flange 52 thereon is a support plate 60. The support plate 60 through its integral flange 61 and the flange 52 is held against disengagement and is telescopically associated with the retainer 50.

The support plate at its center has a threaded aperture 62 through which an elongated adjustable contact 64 passes. The contact 64 extends downwardly into proximity with the fixed contact 42. The support plate 60 is held in the position shown in Figure 1 by means of a compression spring 66 which engages the support plate at the bottom side thereof and is held at its other end by the portion 57 of the flanged apertured plate 56. The cover 24 is removably engaged with the support plate 60 through a slide fit between portions thereof at 70 and is releasably held thereto by means of a spring clip member 72 which passes through an aperture 74 in the support plate. The cover 24 may be either a horn button or a complete spoke cover as shown in Figure 1.

Figure 3:
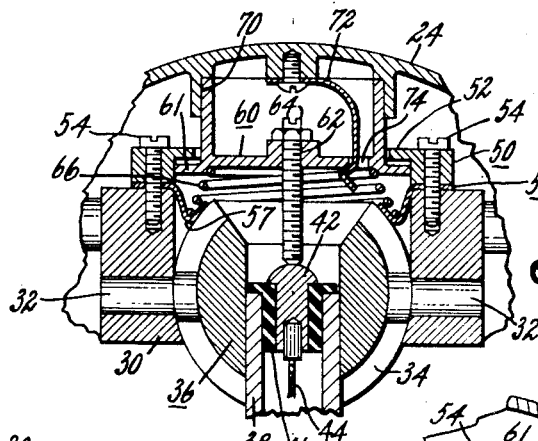
Figure 3 is a view similar to Figure 2 wherein the horn button has been actuated to close the circuit to the horn.
Figure 4:
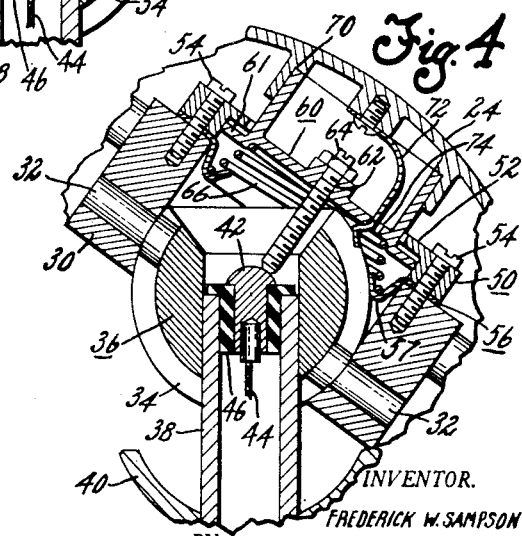
Figure 4 is a view similar to Figure 3 wherein the wheel is in tilted position.

The hub of the wheel forms the other side of the electrical circuit for the horn whereby when the cover 24 is depressed against spring 66 the movable contact 64 comes into engagement with the fixed contact 42 to close the horn circuit as clearly shown in Figure 3. One of the novel features of the invention here is the ability of the whole switch to function even when the wheel is tilted with respect to the steering column as shown in Figure 4. In this connection the socket 40 has been moved downwardly so that the wheel can rotate about the ball 36. Even in tilted position, however, it is apparent that the horn button switch will function as noted in Figure 4 since the fixed contact is substantially at the center of the axis of rotation and the elongated movable contact is therefore free to engage the fixed contact when the spring 66 is compressed.

While the forms of embodiment of the invention as herein disclosed constitute preferred forms, it is to be understood that other forms might be adopted, as may come within the scope of the claims which follow.

What is claimed is as follows:

1. In a horn button assembly for use with a steering which is tiltable in all directions with respect to said column, the combination comprising; a ball-like hub for carrying the steering wheel which is tiltable with respect to the hub, said hub being hollow and having an angled inner wall at the upper end thereof, an actuating member associated with said wheel, an elongated contact carried by said member, a stationary contact carried within said hub adapted to be engaged by said elongated contact and positioned adjacent the center of rotation of said wheel with respect to said column for tilting movement thereof, an electrical circuit controlled by the position of said contacts, and spring means for urging the actuating member toward circuit opening position.

2. In a horn button assembly for use with a vehicle steering wheel that is tiltable in all directions with respect to a supporting steering column, the combination comprising; a hollow ball-like hub for carrying the steering wheel which is tiltable with respect to said hub, a horn button assembly including two telescoping members one of which is reciprocally movable with respect to the other, one of said members being fixedly mounted to said steering wheel, means associated with said fixed member for limiting the movement of the movable member with respect thereto, an elongated contact carried by said movable member, a stationary contact carried within said hub at substantially the center of rotation of said wheel with respect to said column, spring means for normally urging said contacts into open circuit position whereby pressure applied to said movable member sufficient to overcome said spring means will cause said contacts to engage, and an electrical circuit controlled by said contacts.

3. In a horn button assembly for use with a vehicle steering wheel that is tiltable in all directions with respect to a supporting steering column upon which it is mounted through a medium of a ball and socket arrangement wherein the socket is carried by the steering wheel and the ball is carried by the steering column, the combination comprising; two telescoping members one of which is reciprocally movable with respect to the other, one of said members being fixedly mounted to said steering wheel, means associated with said fixed member for limiting the movement of the movable member with respect thereto, a contact carried by said movable member, a second contact carried by said steering column, a brush assembly mounted on said steering wheel and adapted to wipingly engage said ball in any position of said wheel for establishing electrical contact therewith, spring means acting between said brush assembly and said movable member and normally urging said contacts into open position whereby pressure applied to said movable member sufficient to overcome said spring means will cause said contacts to engage, and an electrical circuit controlled by said contacts.

4. In a horn button assembly for use with a vehicle steering wheel that is tiltable with respect to a supporting steering column upon which it is mounted, the combination comprising; a flanged support plate, a downwardly extending contact mounted centrally of said plate and positioned in alignment with said steering column, an apertured retaining plate adapted to be fastened to said steering wheel and to fit loosely over the flange on said support plate for loosely retaining said support plate to said steering wheel, a flanged apertured plate extending downwardly from said retaining plate, spring means disposed between said flanged apertured plate and said support plate for normally urging said plates apart whereby the flange of said support plate contacts the retaining plate for limiting movement thereof in one direction, a stationary contact carried by said steering column and positioned directly beneath said downwardly extending contact, a cover for said support plate whereby pressure applied to said cover compresses said spring means to allow said downwardly extending contact to engage said fixed contact, and an electrical circuit adapted to be energized by the engagement of said contacts.

References Cited in the file of this patent

UNITED STATES PATENTS

| | | |
|---|---|---|
| 1,738,764 | Doane et al. | Dec. 10, 1929 |
| 1,823,809 | Varner et al. | Sept. 15, 1931 |
| 2,042,863 | Pitt | June 2, 1936 |
| 2,167,031 | Pitt | July 25, 1939 |
| 2,206,512 | Reinholz et al. | July 2, 1940 |
| 2,270,850 | McNamara | Jan. 27, 1942 |
| 2,708,695 | Gibbs | May 17, 1955 |
| 2,716,677 | Stafford | Aug. 30, 1955 |